United States Patent [19]
Mattison

[11] Patent Number: 5,159,278
[45] Date of Patent: Oct. 27, 1992

[54] STATE MACHINE ARCHITECTURE PROVIDING INCREASED RESOLUTION OF OUTPUT TIMING

[75] Inventor: Phillip E. Mattison, Gilbert, Ariz.

[73] Assignee: VLSI Technology, Inc., San Jose, Calif.

[21] Appl. No.: 679,379

[22] Filed: Apr. 2, 1991

[51] Int. Cl.⁵ .......................... H03K 3/01; H03K 17/00
[52] U.S. Cl. .......................................... 328/63; 328/72;
    328/137; 328/104; 307/465; 307/269
[58] Field of Search .............. 307/475, 480, 269, 465,
    307/265; 328/63, 72, 104, 137, 154; 377/75, 77, 78

[56] References Cited
U.S. PATENT DOCUMENTS

| | | | |
|---|---|---|---|
| 4,644,568 | 2/1987 | Canniff et al. | 328/154 |
| 4,879,481 | 11/1989 | Pathak et al. | 307/243 |
| 4,942,318 | 7/1990 | Kawana | 307/465 |
| 4,970,410 | 11/1990 | Matsushita et al. | 307/465 |

Primary Examiner—Timothy P. Callahan
Attorney, Agent, or Firm—Douglas L. Weller

[57] ABSTRACT

A circuit allows for improved flexibility in the timing of device output, for example, from a state machine. Output for the device is placed in a first register. The output is forwarded from the first register to a second register. The first register and the second register are clocked on different edges of a clock signal. A selector selects contents of the first register or contents of the second register as the device output for an external device. The selector may be controlled by the contents of one or more flip-flops. When the device is a state machine, the output of each flip-flop may also be used as feedback to the state machine.

23 Claims, 5 Drawing Sheets

STATE MACHINE ARCHITECTURE PROVIDING INCREASED RESOLUTION OF OUTPUT TIMING

BACKGROUND

The present invention concerns an improvement in state machine architecture and other devices, the improvement provides for half clock cycle output resolution while retaining full clock cycle internal logic delays.

In a typical state machine the state logic is logically followed by a clocked register. The clocked register, or output register, typically consists of a D flip-flop for each output of the state logic. Output of the clocked register is used both for output of the state machine and a feedback into the state logic. Based on the feedback and on external control inputs, the state logic generates a new set of outputs.

When designing the state logic it is important to take into account propagation delay of signals travelling through the state logic. In general, there needs to be enough time between clock signals so that inputs to the clocked register are settled before each clock signal.

Each clock signal has a rising edge and a falling edge. Generally, the rising edge and falling edge are separated by a period of time equivalent to one half of the total clock cycle. Sometimes it is desirable to have the output register operate on a different clock edge than the clock edge on which the external control inputs are clocked. For example, this may be used to assure that a device controlled by the state machine does not attempt to read output from the output register of the state machine when the output register is in transition.

The simplest method to have the output register operate on a different clock edge than the clock edge on which the external control inputs are clocked is to clock the output register on a different clock edge than the clock edge on which the external control inputs are clocked. In order to do this, however, the system must be designed so that signals are propagated through the state logic within one half of a clock cycle. Propagation delay, as a percentage of clock cycle, may be decreased in a number of ways. For example, the clock cycle can be lengthened. Alternately, the complexity of the state logic may be reduced, i.e., by reducing the number of components through which a signal needs to travel from the input of the state logic to the output of the state logic. Finally, the state logic may be implemented using faster components, reducing the total propagation delay of a signal by reducing the amount of delay in each component through which it travels.

Another method to have the output register operate on a different clock edge than the clock edge on which the external control inputs are clocked is to clock the output register on a different clock edge than the clock edge on which the external control inputs are clocked, but to only clock the output register on every other clock cycle. In this case, however, adjustments need to be made to the external control inputs to assure that the values are held long enough for the output of the state logic to be clocked into the output register.

The above-described prior art methods for having the output register operate on a different clock edge than the clock edge on which the external control inputs are clocked are effective, but can often result in a decrease in system performance or an increase in system manufacturing cost.

SUMMARY OF THE INVENTION

In accordance with the preferred embodiment of the present invention, a circuit is presented which allows for improved flexibility in the timing of device output, for example, from a state machine. Output for the device is placed in a first register. The output is forwarded from the first register to a second register. Each register may be built from, for example, a plurality of flip-flops. The first register and the second register are clocked on different edges of a clock signal. A selector selects contents of the first register or contents of the second register as the device output for an external device. For each bit of device output, the selector may be, for example, a one-bit multiplexor. Alternately, the selector may be a pair of tri-state gates, with one of the gates having an inverted input.

The selector may be controlled by the contents of one or more flip-flops. For example, if only one flip-flop is used, the entire contents of either the first register or the second register is chosen as device output available to an external device. In this case all device output would be in transition on the same clock edge. Alternately, more than one flip-flop may be used to control the selector, allowinq bits of the device output to change states on different clock edges. For example, a flip-flop may be used to control selection of each bit of device output. In the preferred embodiment, the content of the flip-flops is determined by control signals from the device. For example, if the device is a state machine, the output of each flip-flop may also be used as feedback to the state machine.

The present invention thus allows for an extreme amount of flexibility in the timing characteristics of a device, for example, a state machine. This increase in flexibility is accomplished without requiring changes in the duration of the clock cycle, without requiring that state logic circuitry be reduced in complexity, and without requiring an increase in the speed of performance of components of the state logic circuitry.

DESCRIPTION OF THE PRIOR ART

Figure 1:
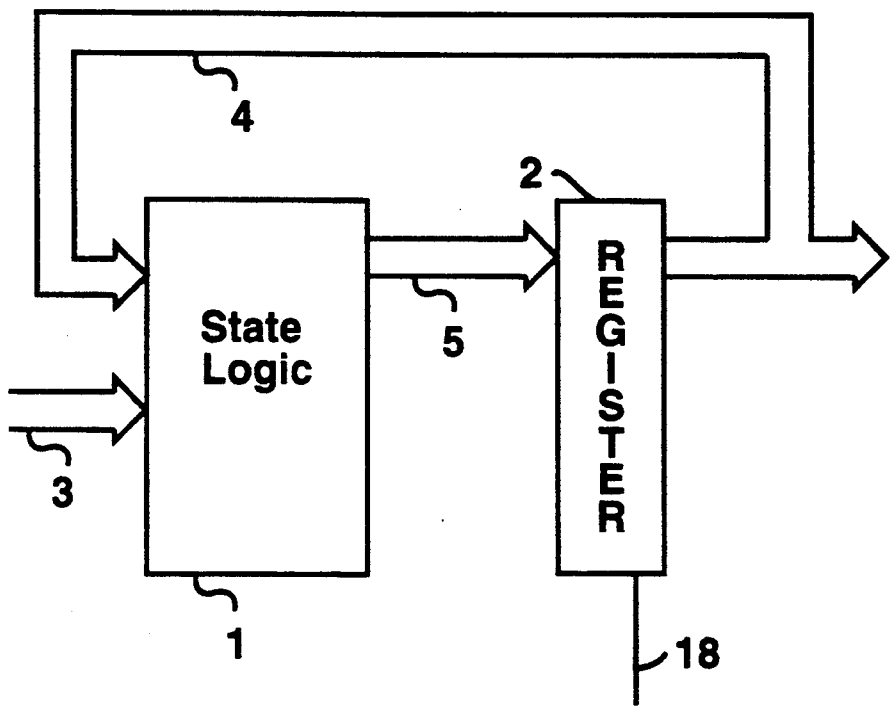
FIGS. 1 is a block diagram of a typical prior art state machine.

FIG. 1 shows a block diagram of a typical prior art state machine. State logic circuitry 1 receives as input external control inputs 3 and feedback 4. From these inputs, state logic circuitry 1 produces state logic output 5. When state logic output 5 is settled, an output register 2 controlled by a clock signal on line 18 receives state logic output 5. The current contents of output register 2 are used as state machine output 6 and feedback 4.

Figure 2:
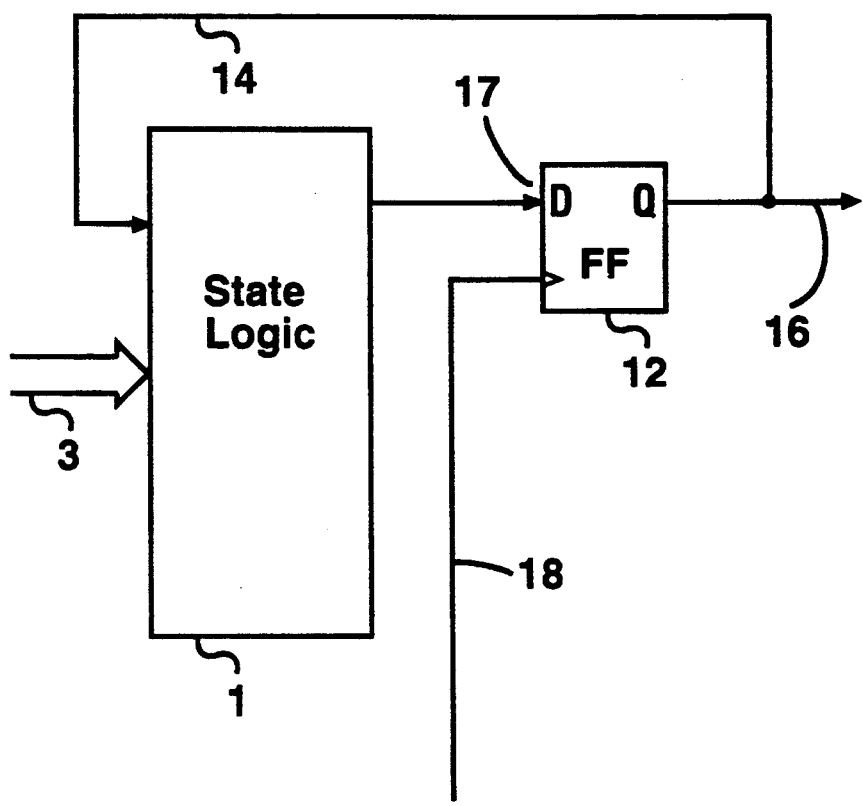
FIG. 2 shows additional detail of the prior art state machine shown in FIG. 1.

FIG. 2 shows additional bit level implementation detail of output register 2. For each output bit of state logic circuitry 1, output register 2 includes a D flip-flop such as D flip-flop 12. D flip-flop 12 receives a bit of information from state logic circuitry 1 through a D input 17. Upon receiving a clock signal over clock line 18. D flip-flop 12 holds on Q output 16 a value placed on D input 17. Q output 6 may also be used to provide feedback to state logic circuitry 1 over feedback line 14.

DESCRIPTION OF THE PREFERRED EMBODIMENT

Figure 3:
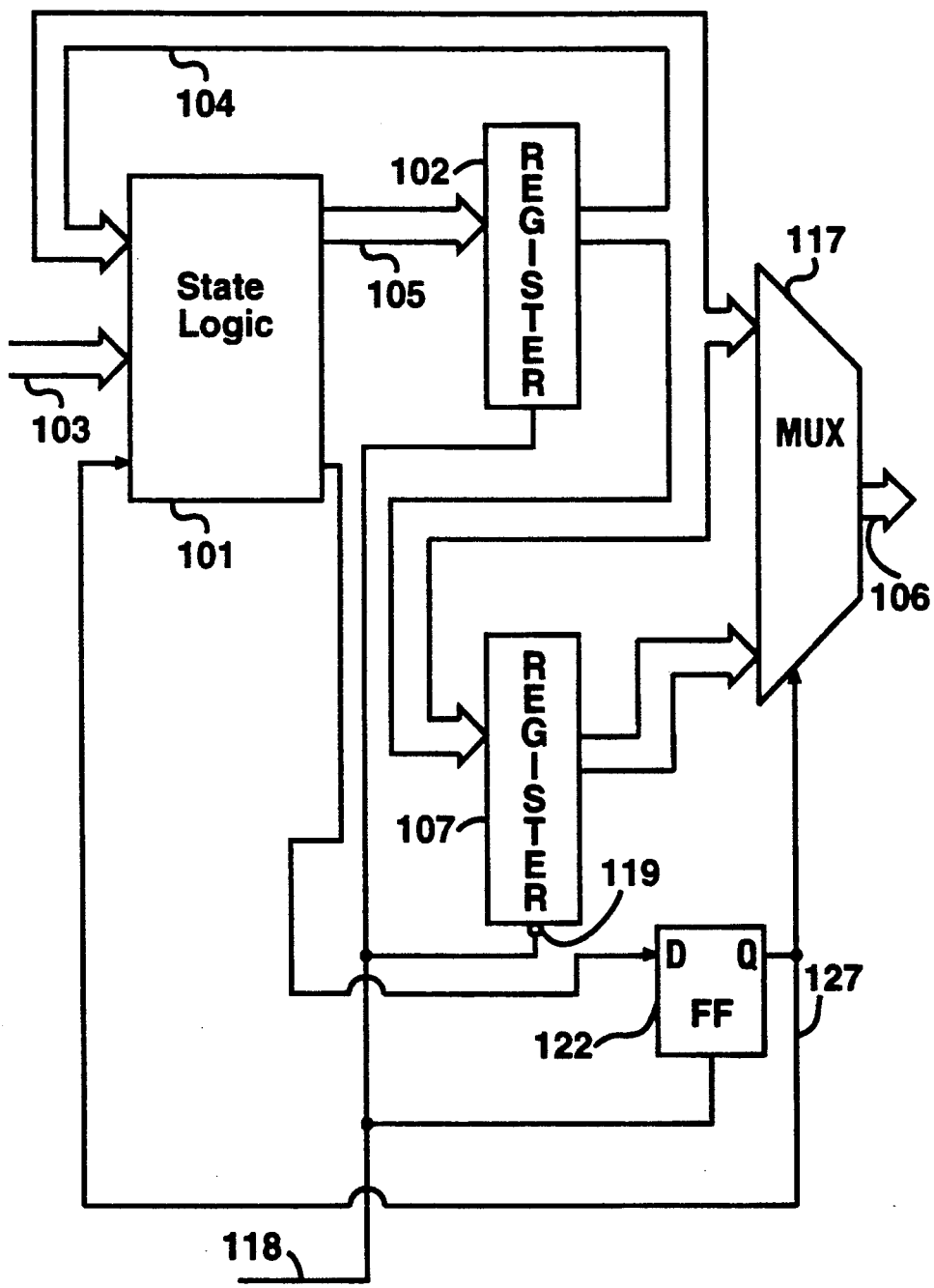
FIGS. 3 and 4 are block diagrams of a state machine in accordance with a preferred embodiment of the present invention.
Figure 4:
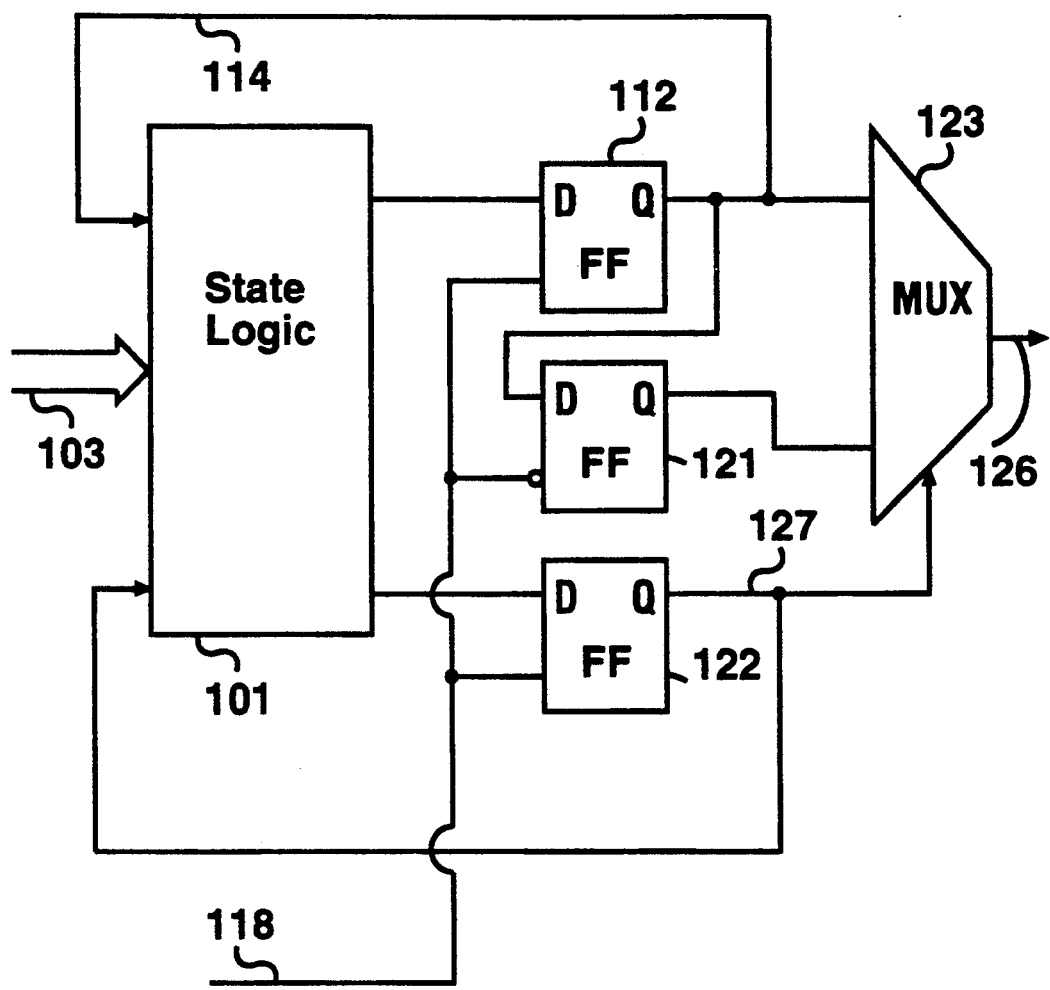

FIG. 3 shows a block diagram of a state machine in accordance with the preferred embodiment of the present invention. State logic circuitry 101 receives as input external control inputs 103 and feedback 104. From these inputs, state logic circuitry 101 produces state logic output 105. When state logic output 105 is settled, an output register 102 controlled by a clock signal on line 118 receives state logic output 105. The current contents of output register 102 are available as input to a multiplexor 117, as input to an output register 107 and as feedback 104. The current contents of output register 107 are available as an input to multiplexor 117. Output register 107, through an inverted clock input 119, is clocked on a different clock edge than register 102. Multiplexor selects either output from register 102 or output from register 107 to be forwarded as state machine output 106. Multiplexor 117 is controlled, for example, by a signal on an output line 127 connected to a Q output of a D flip-flop 122. The signal on output line 127 may also be used as feedback for state logic circuitry 101. Input to D flip-flop 122 is, for example, generated by state logic circuitry 101. This allows state logic circuitry 101 to determine on which clock edge state machine output 106 is in transition.

FIG. 3 shows additional bit level implementation detail of output register 102 and output register 105. For each output bit of state logic circuitry 101, output register 102 includes a D flip-flop such as D flip-flop 112. D flip-flop 112 receives a bit of information from state logic circuitry 101. Output from D flip-flop 112 is used as input for a one bit multiplexor slice 123 and a D flip-flop 121 within register 107. Output from D flip-flop 112 is also, for example, used to generate feedback for state logic circuitry 101 over a line 114. Output 127 from D flip-flop 122 is used to control one bit multiplexor slice 123.

Figure 5:
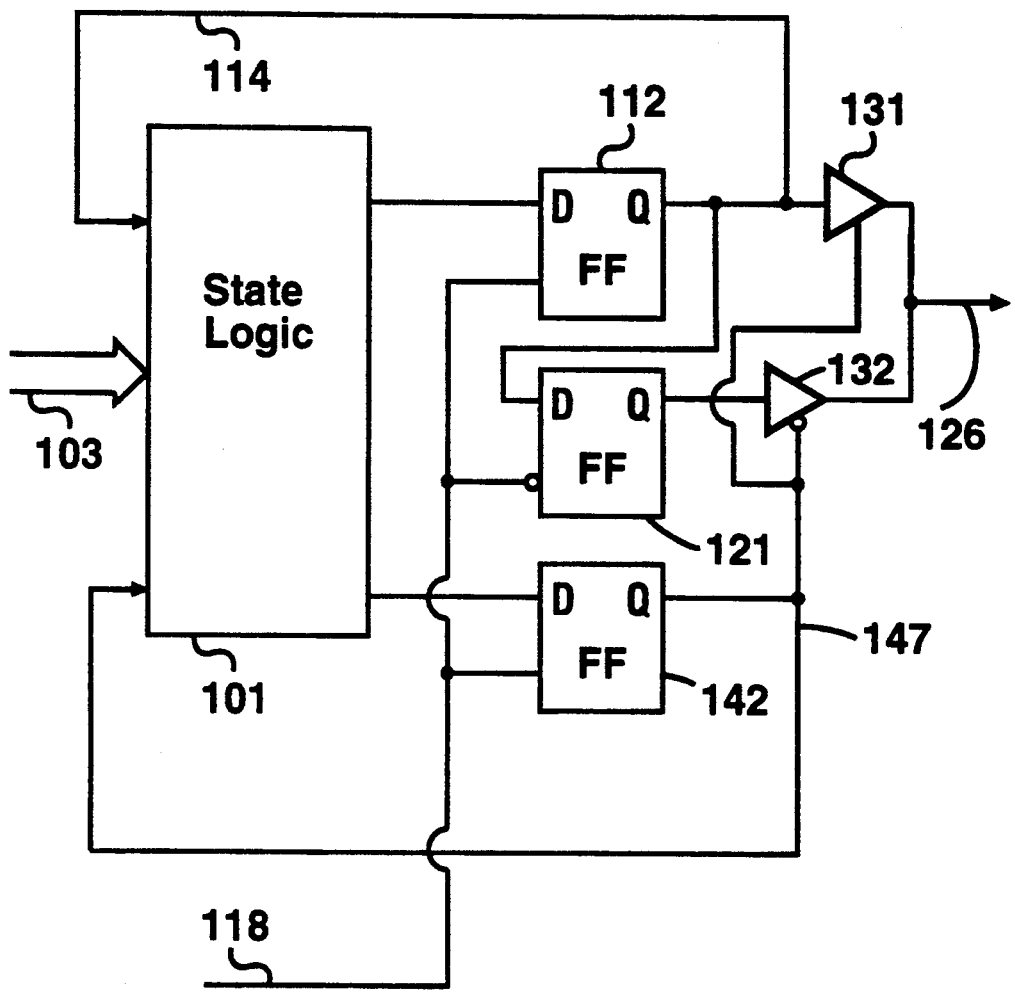
FIG. 5 is a block diagram of a state machine in accordance with an alternate preferred embodiment of the present invention.

FIG. 5 shows an alternate embodiment in which multiplexor 117, is replaced by a pair of tri-state gates for each bit of state machine output 106. For example, as shown in FIG. 5, one bit multiplexor slice 123 is replaced by a tri-state gate 131 and a tri-state gate 132. Both tri-state gate 131 and tri-state gate 132 are controlled by an the signal on an output line 147; however, tri-state 132 has an inverted input while the input to tri-state 131 is not inverted. The advantage of using pairs of tri-state gates is that this eliminates the propagation delay through a multiplexor.

Also, as part of the alternate embodiment, a signal on a separate line may be generated by a separate D flip-flop for each pair of tri-state gates (or one bit multiplexor slice). For example, in FIG. 5, a D flip-flop 142 is shown controlling tri-state gate 131 and tri-state gate 132. D flip-flop 142 may be used to control only tri-state gate 131 and tri-state gate 132, or D flip-flop 142 may be used to control two or more pairs of tri-state gates. Output line 147 may also be used to provide feedback to state logic circuitry 101 as shown. In this embodiment of the present invention, state logic circuitry 101 can continuously control output to the state machine so that certain bits of output are available on one clock edge and other bits of output are available on another clock edge.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a device, a circuit for providing for flexibility in timing of providing device output to an input of an external device, the circuit comprising:

first register means, including an input and an output, for receiving the device output at the input of the first register means and placing the device output at the output of the first register means;

second register means, including an input and an output, the input of the second register means being coupled to the output of the first register means, for receiving the device output from the output of the first register means at the input of the second register means and placing the device output at the output of the second register means;

clocking means, coupled to the first register means and the second register means, for clocking the first register means on a first clock edge of a clock signal and clocking the second register means on a second clock edge of the clock signal, wherein the first clock edge does not equal the second clock edge; and, selection means, coupled to the output of the first register means and the output of the second register means, for selecting a first of the output of the first register means and the output of the second register means to be ellectrically coupled to the input of the external device.

2. A device as in claim 1 wherein
the device output comprises a plurality of bits;
the first register means comprises a flip-flop for each bit of the device output; and,
the second register means comprises a flip-flop for each bit of the device output.

3. A device as in claim 1 wherein
the device is a state machine and the device output is coupled to an input of the state machine.

4. A device as in claim 3 wherein the selection means includes
multiplexor means for selecting the first of the output of the first register means and the output of the second register means to be electrically coupled to the input of the external device; and,
control means for controlling the multiplexor means.

5. A device as in claim 4 wherein
the state machine includes state logic circuitry, the state logic circuitry having an output, and
the control means is a flip-flop which includes an input and an output, the input of the flip-flop being coupled to the output of the state logic circuitry, and the output of the flip-flop being coupled to the multiplexor means and providing a control signal to the multiplexor means.

6. A device as in claim 5 wherein the control signal is coupled to an input of the state machine.

7. A device as in claim 4 wherein the device output comprises a plurality of bits; and, the control means comprises a plurality of flip-flops, each flip-flop controlling selection for at least one bit of the device output.

8. A device as in claim 7 wherein control signals from each flip-flop in the plurality of flip-flops are coupled to an input of the state machine.

9. A device as in claim 3 wherein
the device output comprises a plurality of bits; and,
the selection means includes a pair of tri-state gates for each bit of the device output, one of the tri-state gates in each pair having an inverted input.

10. A device as in claim 9 wherein
the state machine includes state logic circuitry, the state logic circuitry having an output, and
each of the pairs of tri-state gates is controlled by a flip-flop, an input of the flip-flop being coupled to the output of the state logic circuitry and an output of the flip-flop providing a control signal to each pair of tri-state gates.

11. A device as in claim 10 wherein each control signal is coupled to an input of the state machine.

12. A circuit for providing for flexibility in the timing of providing device output from a device to an input of an external device, the circuit comprising for each bit of device output;
first flip-flop means, having an input coupled to the device output and having an output, for, at the input of the first flip-flop means, receiving a bit of the device output from the device;
second flip-flop means, having an input coupled to the output of the first flip-flop means and having an output, for receiving on the input of the second flip-flop means, the bit of the device output from the output of the first flip-flop means;
clocking means for clocking the first flip-flop means on a first clock edge of a clock signal and clocking the second flip-flop means on a second clock edge of the clock signal, wherein the first clock edge does not equal the second clock edge; and,
selection means, coupled to the output of the first flip-flop means and to the output of the second flip-flop means, for selecting a first of the output of the first flip-flop means and the output of the second flip-flop means to be electrically coupled to the input of the external device.

13. A device as in claim 12 wherein the device is state logic circuitry and the bit of the device output received by the first flip-flop means is coupled to an input of the state logic circuitry.

14. A device as in claim 13 wherein the selection means comprises a pair of tri-state gates, one of the tri-state gates having an inverted input.

15. A device as in claim 14 wherein the pair of tri-state gates is controlled by a flip-flop, an input of the flip-flop being coupled to an output of the state logic circuitry, and output from the flip-flop providing a control signal to the pair of tri-state gates.

16. A device as in claim 15 wherein the control signal is coupled to an input of the state logic circuitry.

17. A method for providing flexibility in output timing of a device, for each bit of output, the method comprising the steps of:
(a) storing the bit in a first flip-flop;
(b) forwarding the bit from the first flip-flop to a second flip-flop;
(c) clocking the first flip-flop and the second flip-flop using different edges of a clock signal, wherein the clocking is done simultaneously with steps (a) and (b) and the clocking determines timing for step (b); and,
(d) selecting one of the first flip-flop and the second flip-flop to be electrically coupled to an input of an external device.

18. A method as in claim 17 additionally comprising the step of:
(e) providing the bit stored in the first flip-flop to an input of the device.

19. A method as in clam 17 wherein step (d) includes the substeps of:
(d.1) sending from the device to a third flip-flop, a control bit;
(d.2) sending from the third flip-flop to a selector the control bit;
(d.3) selecting by the selector on the basis of the control bit, one of the first flip-flop and the second flip-flop to provide output to an external device.

20. A method as in claim 19 wherein the selector is a multiplexor.

21. A method as in claim 19 wherein the selector is a pair of tri-state gates.

22. A method as in claim 19 wherein the device is a state machine and output from the third flip-flop is connected to an input of the state machine.

23. A method as in claim 17 wherein the device is a state machine.

* * * * *